US012123574B2

(12) United States Patent
Georgiev

(10) Patent No.: US 12,123,574 B2
(45) Date of Patent: Oct. 22, 2024

(54) RECESSED LIGHT-EMITTING DIODE LIGHTING FIXTURE

(71) Applicant: SATCO PRODUCTS, INC., Brentwood, NY (US)

(72) Inventor: Georgi Yosifov Georgiev, Delta (CA)

(73) Assignee: SATCO PRODUCTS, INC., Brentwood, NY (US)

( * ) Notice: Subject to any disclaimer, the term of this patent is extended or adjusted under 35 U.S.C. 154(b) by 0 days.

(21) Appl. No.: 17/982,871

(22) Filed: Nov. 8, 2022

(65) Prior Publication Data

US 2023/0059474 A1 Feb. 23, 2023

Related U.S. Application Data

(63) Continuation of application No. 16/506,799, filed on Jul. 9, 2019, now Pat. No. 11,493,187, which is a (Continued)

(51) Int. Cl.

| | |
|---|---|
| *F21V 14/00* | (2018.01) |
| *F21S 8/02* | (2006.01) |
| *F21V 14/06* | (2006.01) |
| *F21V 17/02* | (2006.01) |
| *F21V 17/12* | (2006.01) |
| *F21V 19/00* | (2006.01) |
| *F21V 21/04* | (2006.01) |

(Continued)

(52) U.S. Cl.

CPC .............. *F21V 14/06* (2013.01); *F21S 8/026* (2013.01); *F21V 17/02* (2013.01); *F21V 17/12* (2013.01); *F21V 19/0055* (2013.01); *F21V 21/04* (2013.01); *F21V 21/045* (2013.01); *F21V 21/26* (2013.01); *F21V 21/30* (2013.01); *F21V 23/023* (2013.01); *F21V 23/06* (2013.01); *F21V 29/70* (2015.01); *F21V 29/74* (2015.01); *F21V 29/77* (2015.01); *F21V 31/005* (2013.01); *F21V 21/046* (2013.01); *F21V 29/76* (2015.01); *F21Y 2115/10* (2016.08)

(58) Field of Classification Search

CPC ........ F21V 29/70; F21V 21/04; F21V 21/045; F21V 31/005

See application file for complete search history.

(56) References Cited

U.S. PATENT DOCUMENTS

2010/0061108 A1* 3/2010 Zhang .................. F21V 29/713 362/364
2013/0294084 A1* 11/2013 Kathawate ............. F21S 8/024 362/257

(Continued)

*Primary Examiner* — Gerald J Sufleta, II
(74) *Attorney, Agent, or Firm* — Greenberg Traurig, LLP

(57) ABSTRACT

A recessed lighting fixture comprises a generally annular body having a central cavity in the form of a partially spherical socket. There is a lighting support member having a partially spherical exterior portion which is closely fitted within the partially spherical socket of the annular body. The lighting support member is pivotable relative to the annular body, but air flow between the partially spherical socket of the annular body and the partially spherical exterior portion of the lighting support member is substantially restricted. There may be a light source mounted to the lighting support member adjacent a bottom thereof. The light source may be a light-emitting diode.

20 Claims, 10 Drawing Sheets

Related U.S. Application Data continuation of application No. 15/604,577, filed on May 24, 2017, now Pat. No. 10,344,952.

(60) Provisional application No. 62/340,805, filed on May 24, 2016.

(51) Int. Cl.

| | |
|---|---|
| ***F21V 21/26*** | (2006.01) |
| ***F21V 21/30*** | (2006.01) |
| ***F21V 23/02*** | (2006.01) |
| ***F21V 23/06*** | (2006.01) |
| ***F21V 29/70*** | (2015.01) |
| ***F21V 29/74*** | (2015.01) |
| ***F21V 29/77*** | (2015.01) |
| ***F21V 31/00*** | (2006.01) |
| *F21V 29/76* | (2015.01) |
| *F21Y 115/10* | (2016.01) |

(56) References Cited

U.S. PATENT DOCUMENTS

| | | | | |
|---|---|---|---|---|
| 2017/0184285 | A1* | 6/2017 | Visser | F21V 23/008 |
| 2018/0372283 | A1* | 12/2018 | Zeng | F21S 8/026 |

* cited by examiner

RECESSED LIGHT-EMITTING DIODE LIGHTING FIXTURE

CROSS REFERENCE TO RELATED APPLICATIONS

This application is a continuation of U.S. patent application Ser. No. 16/506,799, filed Jul. 9, 2019, now U.S. Pat. No. 11,493,187, which is a continuation of U.S. patent application Ser. No. 15/604,577, filed May 24, 2017, now U.S. Pat. No. 10,344,952, which claims the benefit of U.S. Provisional Application Ser. No. 62/340,805, filed May 24, 2016. Each of the above-identified patent applications are incorporated herein by reference in their entirety.

BACKGROUND OF THE INVENTION

Field of the Invention

The present invention relates to lighting fixtures and, in particular, to recessed lighting fixtures for light-emitting diode (LED) lighting.

Description of the Related Art

It is known to provide buildings with recessed light-emitting diode (LED) lighting fixtures. This typically includes providing an LED lighting fixture mounted flush with the exterior of the ceiling. The LED lighting fixture extends through an aperture in the ceiling. A metal box is normally mounted on the interior of the ceiling above the aperture for the LED lighting fixture. A power supply for the lighting fixture may be mounted on the metal box. Considerable installation work is accordingly involved if the ceiling is to be retrofitted with such fixtures. A large opening has to be made to fit the box and thereafter the ceiling has to be replaced to cover the bottom of the box apart from the aperture for the lighting fixture.

It is also desirable for many purposes to allow the lens of the LED lighting fixture to be pivoted to a desired angle to illuminate specific things in a room, for example, artwork. Pivoting may be also required when the LED lighting fixture is mounted on, for example, an angled ceiling or wall. However, conventional LED lighting fixtures which allow pivoting of the lens have gaps between the lens and the annular body of the fixture in order to accommodate pivoting.

LED lighting fixtures have been developed which do not require a separate metal box, but instead are connected to a sealed power supply via an electrical conductor. The power supply for such units can simply be positioned on the interior of the ceiling without requiring a fixed type of mounting. This considerably simplifies the difficulty and cost of installing LED lighting fixtures, particularly for existing buildings.

However, LED lighting fixtures of the type not requiring a metal box usually have the bottom of the lens in a fixed, horizontal position. This is because it is undesirable to allow air flow through the LED lighting fixtures since this may cause considerable heat loss through the ceiling. Metal boxes are accordingly mounted above the fixtures in order to prevent air flow through the ceiling.

SUMMARY OF THE INVENTION

There is provided, according to the invention, a recessed lighting fixture comprising a generally annular body having a central cavity in the form of a partially spherical socket.

There is a lighting support member having a partially spherical exterior portion which is closely fitted within the partially spherical socket of the annular body. The lighting support member is pivotable relative to the annular body. Air flow between the partially spherical socket of the annular body and the partially spherical exterior portion of the lighting support member is substantially restricted. There may be a light source mounted to the lighting support member adjacent a bottom thereof. The light source may be a light-emitting diode.

The lighting fixture may include a resilient, annular seal which sealingly extends between the partially spherical exterior portion of the lighting support member and the partially spherical socket of the annular body. The seal may be an annular O-ring. The O-ring may be of silicone.

The lighting fixture may include spring-loaded members connected to the annular body adjacent to a top thereof and extending outwardly therefrom. The spring-loaded members may be configured to resiliently contact an upper, interior surface of a ceiling. Each of the spring-loaded members may include a coil spring mounted on the lighting support member and an outwardly extending arm connected to the coil spring.

The lighting fixture may have an outwardly extending annular flange adjacent a bottom of the annular body for fitting over an exterior surface of a ceiling. The lighting fixture may include a heat sink mounted on the lighting support member adjacent a top thereof.

There is also provided, according to the invention, a recessed lighting assembly comprising a recessed lighting fixture having a generally annular body with a central cavity in the form of a partially spherical socket. The lighting fixture also includes a lighting support member having a partially spherical exterior portion which is closely fitted within the partially spherical socket of the annular body. The lighting support member is pivotable relative to the annular body, but air flow between the partially spherical socket of the annular body and the partially spherical exterior portion of the lighting support member is substantially restricted. The lighting assembly further includes a power supply module and an electrical conductor connecting the lighting fixture to the power supply module. There may be a light source mounted to the lighting support member of the lighting fixture adjacent a bottom thereof. The light source may be a light-emitting diode.

BRIEF DESCRIPTIONS OF DRAWINGS

The invention will be more readily understood from the following description of the embodiments thereof given, by way of example only, with reference to the accompanying drawings, in which.

DESCRIPTIONS OF THE SPECIFIC EMBODIMENTS

Figure 1:
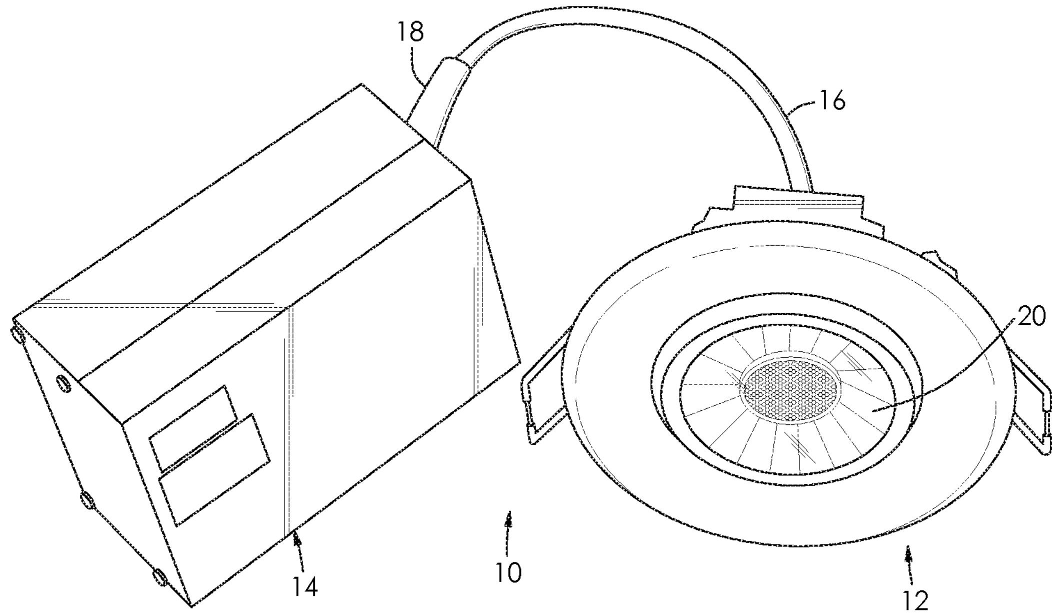
FIG. 1 is a bottom, side isometric view of a lighting assembly including a lighting fixture and a power supply connected thereto by an electrical conductor.
Figure 2:
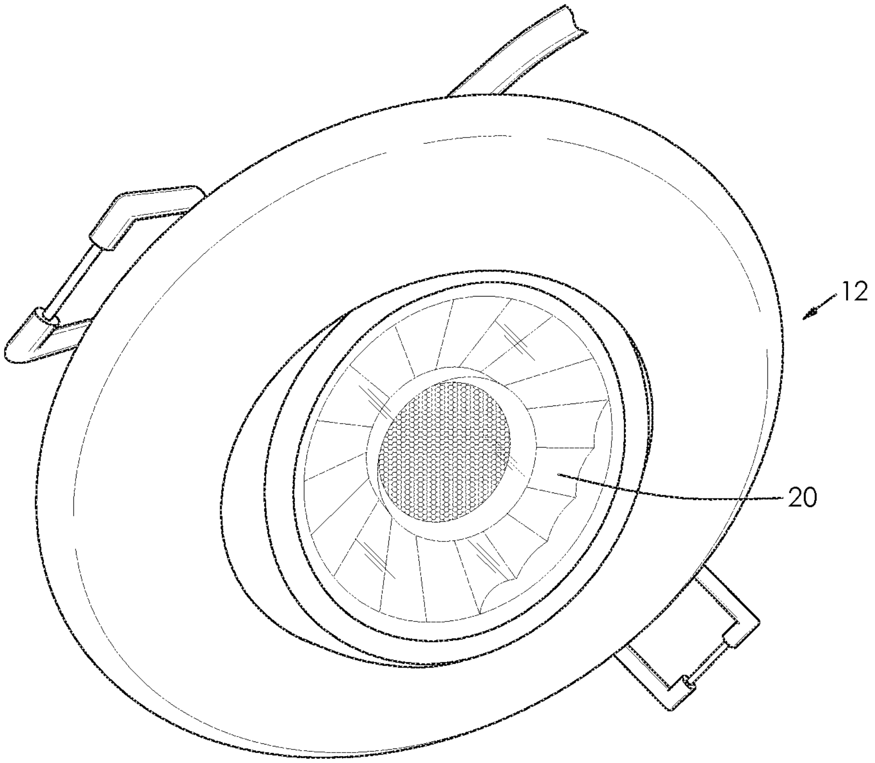
FIG. 2 is a bottom, side isometric view of the lighting fixture of FIG. 1 with a lens thereof shown in a tilted position.

Referring to the drawings, and first to FIG. 1, there is shown a lighting assembly 10. The lighting assembly 10 includes a lighting fixture 12 which, in this example, is a light-emitting diode lighting fixture. The lighting fixture 12 is connected to a power supply module 14 by an electrical conductor 16 which is provided with a connector portion 18. The connector portion 18 may be a two-pin socket. This general arrangement is known and the power supply and conductor are available, for example, from Lotus Invest Ltd DBA Lotus LED Lights which has a business address at 1080 Cliveden Ave, Unit 7 Delta, British Columbia, Canada, V3M 6G6. The lighting fixture 12 however offers significant advantages over conventional recessed lighting fixtures used previously in such assemblies. In particular, the lighting fixture 12 has a lens 20 which is gimbal mounted to permit tilting of the lens up to 30° in any desired direction. FIG. 2 shows the lens 20 tilted in one direction.

Figure 3:
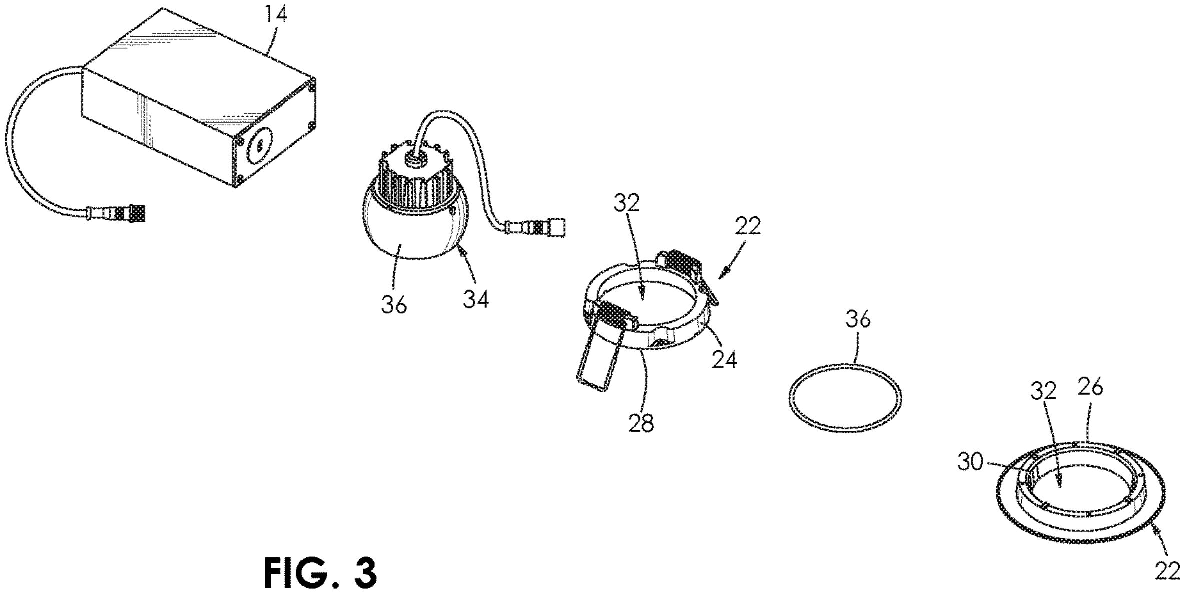
FIG. 3 is an exploded, side isometric view of the lighting fixture of FIG. 1.
Figure 10:
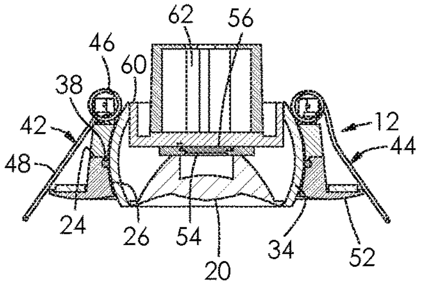
FIG. 10 is a side, sectional view of the lighting fixture of FIG. 1 taken along lines 10-10 of FIG. 8.

An exploded view of the lighting fixture 12 is best shown in FIG. 3. The lighting fixture 12 includes an annular body 22 which has an upper portion 24 and a lower portion 26. A bottom 28 of the upper portion 24 abuts a top 30 of the lower portion 26 when the lighting fixture 12 is assembled as shown, for example, in FIG. 6. Referring back to FIG. 3, the upper portion 24 and the lower portion 26 of the annular body 22 define a central cavity in the form of a partially spherical socket 32. The annular body 22 is of metal in this example. The lighting fixture 12 also includes a lighting support member 34 which is also of metal in this example. The lighting fixture 12 has a partially spherical exterior portion 36. The partially spherical exterior portion 36 of the lighting support member 34 is closely fitted within the partially spherical socket 32 of the annular body 22 when the lighting fixture 12 is assembled as shown, for example, in FIG. 10. This permits pivoting of the lighting support member 34 relative to the annular body 22. Referring back to FIG. 3, there is also a flexible O-ring 38 which is disposed between the upper portion 24 and the lower portion 26 of the annular body 22 when the lighting fixture is assembled as shown, for example, in FIG. 10. The O-ring 38 sealingly extends between the partially spherical socket 32 of the annular body 22 and the partially spherical exterior portion 36 of the lighting support member 34 when the lighting fixture 12 is assembled. This substantially restricts air flow between the partially spherical socket 32 of the annular body 22 and the partially spherical exterior portion 36 of the lighting support member 34.

Figure 4:
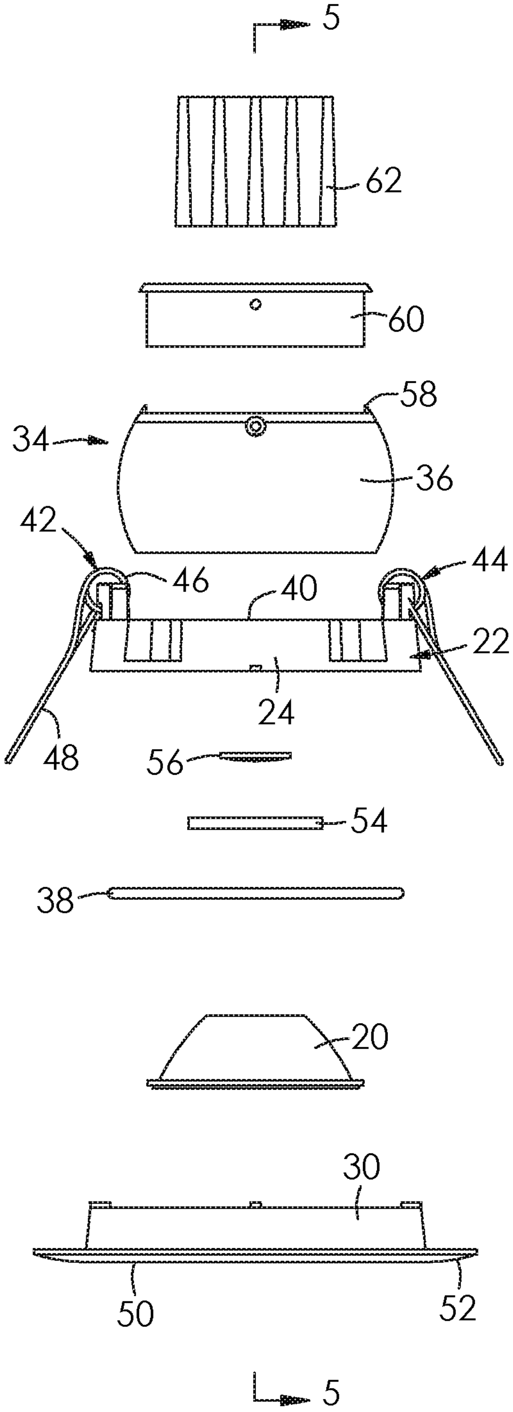
FIG. 4 is an exploded, side elevational view of the lighting fixture of FIG. 1.
Figure 5:
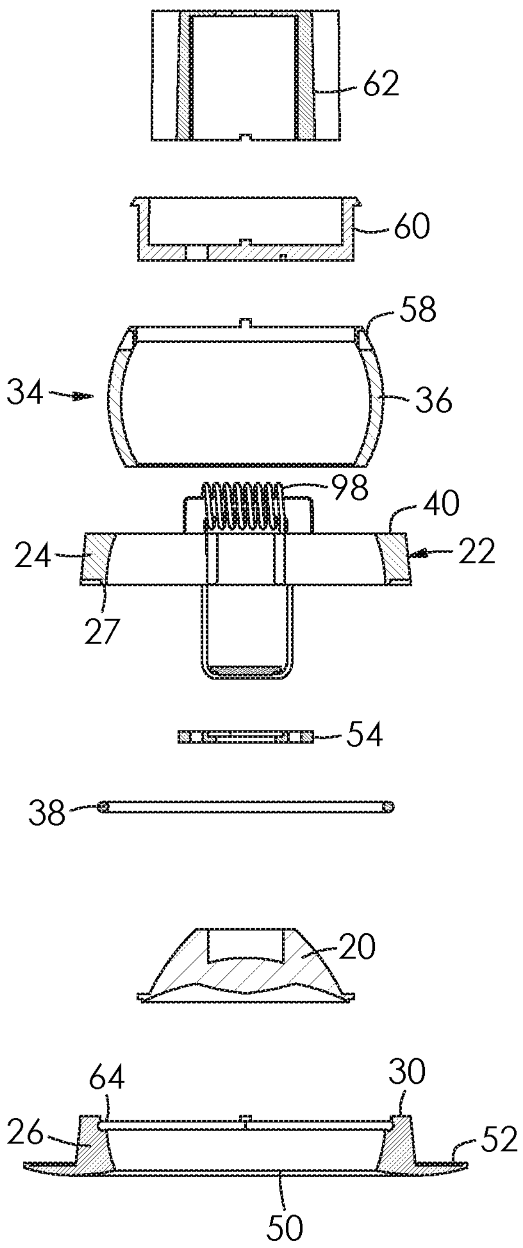
FIG. 5 is an exploded, side elevational view of the lighting fixture of FIG. 1 taken along lines 5-5 of FIG. 4.

The annular body 22 has a top 40 as shown, for example, in FIGS. 4 and 5, and a pair of spring-loaded members 42 and 44. Each of these spring-loaded members, for example spring-loaded member 42, includes a coil spring 46 mounted on the top 40 of the annular body 22. An arm 48 is connected to the coil spring 46 and extends outwardly therefrom. The arm 48 is generally U-shaped and formed from wire. The annular body 22 also has a bottom 50 with an outwardly extending annular flange 52 thereon adjacent the bottom 50 thereof. The lighting support member 34 has the lens 20 mounted thereon and a bracket 54 for receiving a light source which, in this example, is a light-emitting diode 56. However, the light source may be different in other embodiments and may be, for example, a halogen light bulb. The lighting support member 34 has a top 58 with a heat sink 60 mounted thereon. The heat sink 60 has a plurality of cooling fins 62.

In this example, the O-ring 38 is received within an annular groove 64, best shown in FIG. 5, extending about the lower portion 26 of the annular body 22 near the top 30 thereof. The O-ring 38 effectively seals the lighting fixture 12 and prevents air leakage therethrough when the lighting fixture is assembled as shown in FIGS. 7 to 10. The O-ring 38 is silicone, in this example, but other suitable resilient materials could be substituted. Furthermore, other types of seals could be substituted for the O-ring 38 which would permit pivoting of the lighting support member 34 relative to the annular body 22, while preventing the flow of air between the lighting support member 34 and the annular body 22.

Figure 11:
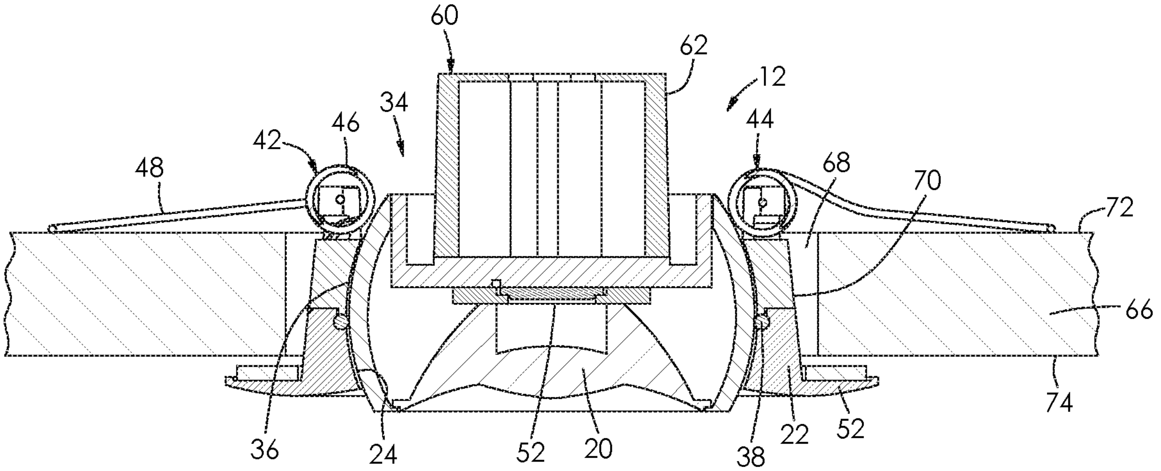
FIG. 11 is a side, sectional view showing the light fixture mounted on a ceiling, with the ceiling being shown in fragment.

The lighting fixture 12 is installed by first cutting the ceiling 66, shown in FIG. 11, to form the aperture 68 which is circular in this example and slightly larger than exterior annular wall 70 on the annular body 22 above the flange 52. The power supply module 14 is positioned on top of the interior surface 72 of the ceiling 66 and is connected to the lighting fixture 12 via the electrical conductor 16 and the connector portion 18 as shown in FIG. 1.

Figure 6:
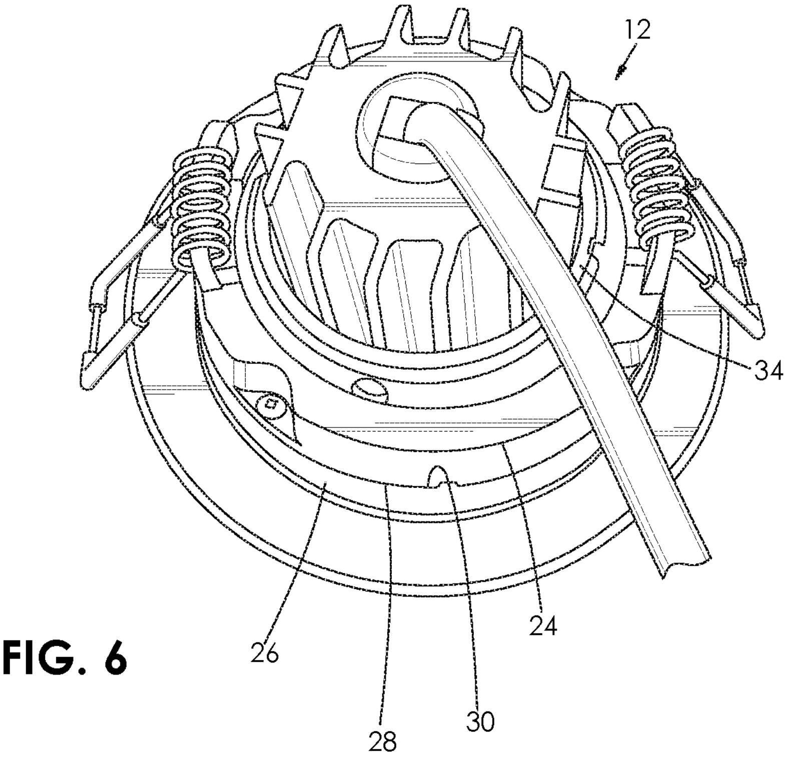
FIG. 6 is a top, side isometric view of the lighting fixture of FIG. 1 showing a heat sink and spring-loaded members thereof.
Figure 7:
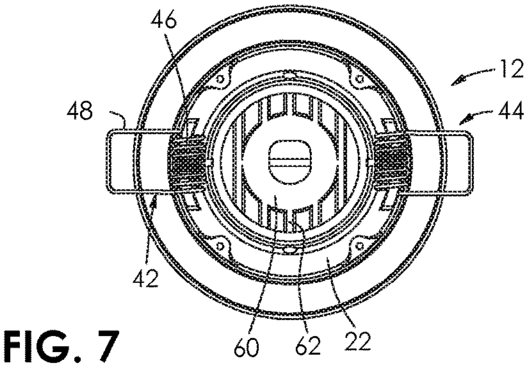
FIG. 7 is a top, plan view of the lighting fixture of FIG. 1.
Figure 8:
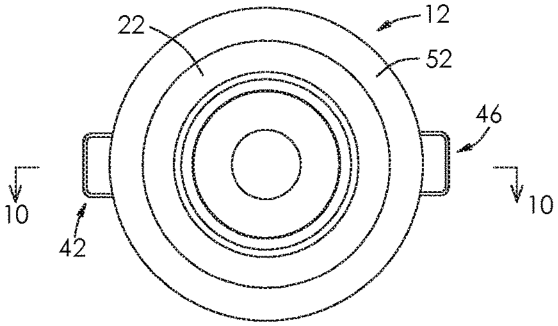
FIG. 8 is a bottom plan view of the lighting fixture of FIG. 1.
Figure 9:
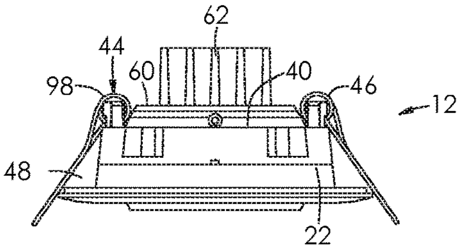
FIG. 9 is a side, elevational view of the lighting fixture of FIG. 1.

The arms 48 of the spring loaded members 42 and 44 are configured to resiliently contact an upper, interior surface 72 of the ceiling 66 when the lighting fixture 12 is installed as shown in FIG. 11. FIG. 6 show the arms 48 of the spring loaded members 42 and 44 in a non-deflected position prior to installation of the lighting fixture 12. Thus, when the lighting fixture 12 is installed within the ceiling 66 as shown in FIG. 11, the arms 100 are deflected and are resiliently biased against the interior surface 72 of the ceiling 66 to secure the lighting fixture in place with the flange 52 against an exterior surface 74 of the ceiling 66.

The arms 48 of the spring-loaded members 94 and 96 are rotated upwardly and substantially vertically to positions near the cooling fins 62 so they can be inserted through the aperture 68 in the ceiling. The lighting fixture 12 is oriented with the flange 52 at the bottom and the lighting fixture 12 is then inserted upwardly through the aperture 68 with the arms 48 held in the raised positions until the arms are inserted through the aperture. The arms 48 can then be released and upward movement of the lighting fixture 12 is continued until the flange 52 contacts the exterior surface 74 of the ceiling 66. When the arms 48 become aligned with the interior surface 72 of the ceiling 66, the arms begin to move downwardly due to the resiliency of the coil springs 46 and continue to the generally horizontal positions shown in FIG. 11 where the arms 48 are pressed against the interior surface

72 of the ceiling and secure the lighting fixture 12 in place with the flange 52 pressed against the exterior surface 74 of the ceiling 66. The flange 52 fits over the exterior surface 74 of the ceiling 66 with the annular body 22 extending through the aperture 68 in the ceiling 66. The aperture is circular in this example.

Figure 12:
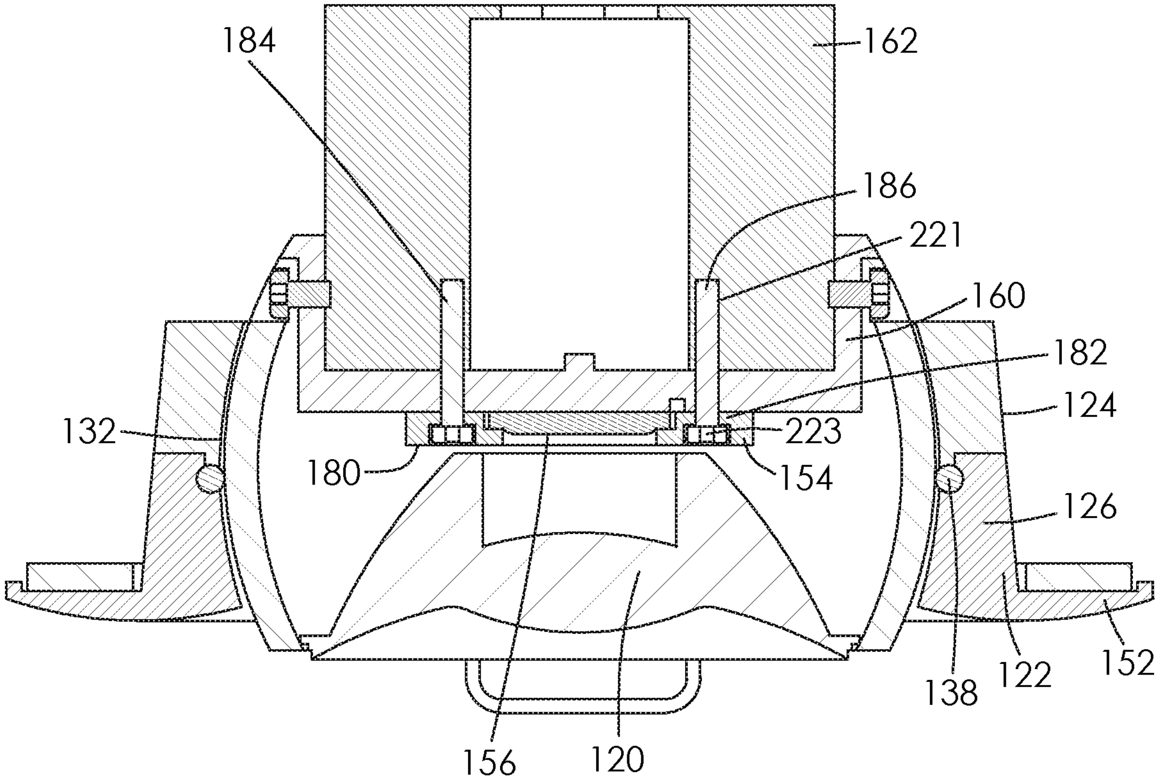
FIG. 12 is a side, sectional view of a lighting assembly according to an alternative embodiment of the invention.
Figure 13:
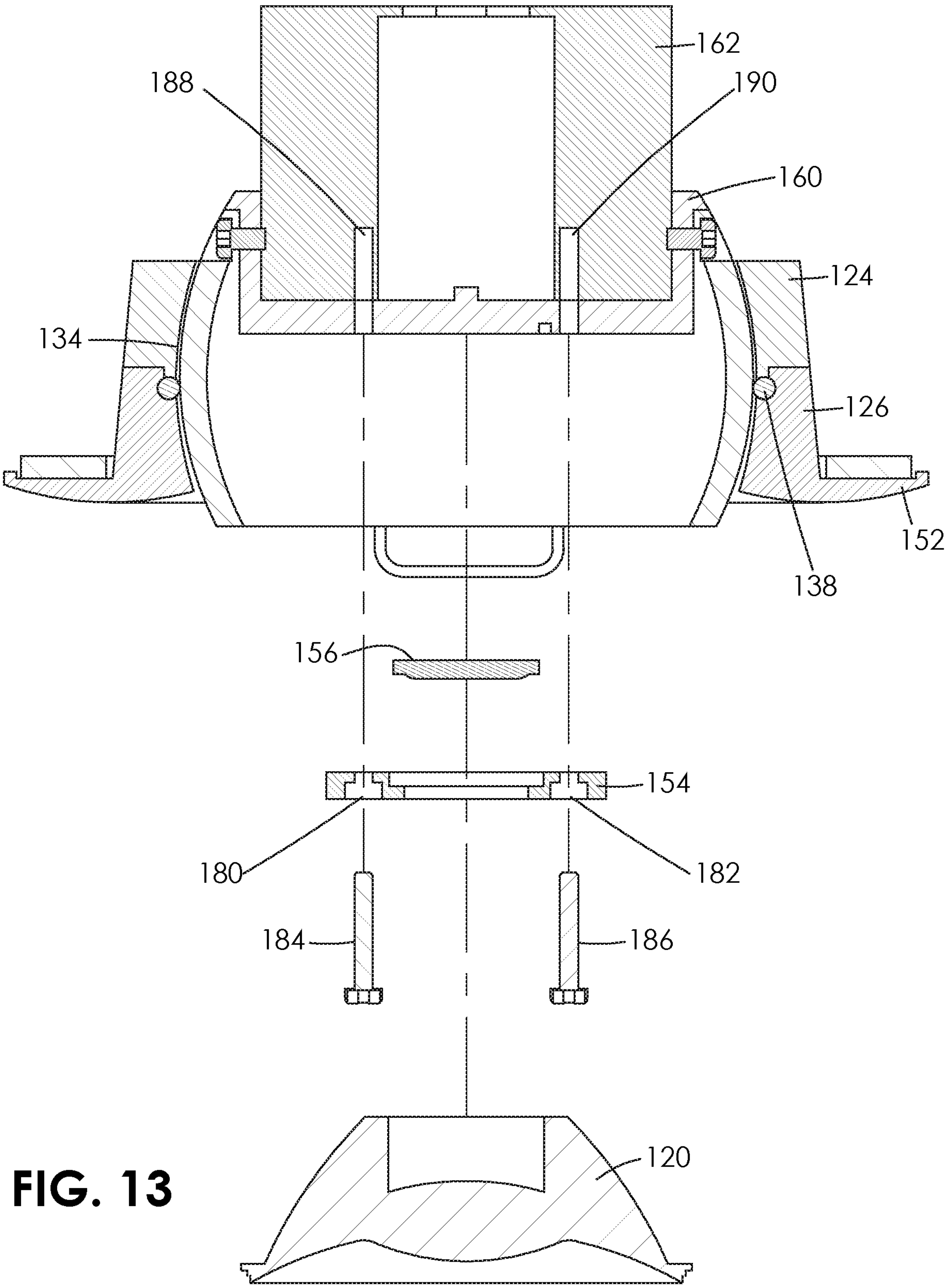
FIG. 13 is a partially exploded view similar to FIG. 12 with the lens and light-emitting diode of the lighting assembly shown disassembled.
Figure 14:
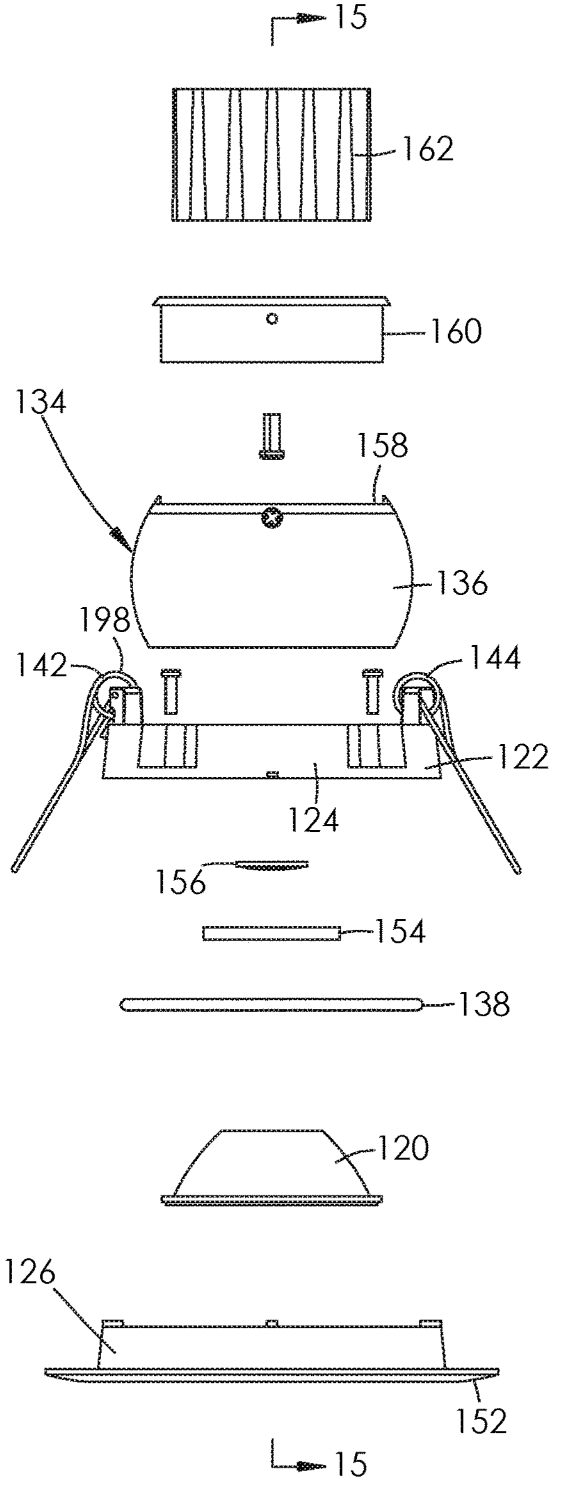
FIG. 14 is an exploded, side elevational view of the lighting fixture of FIG. 12.
Figure 15:
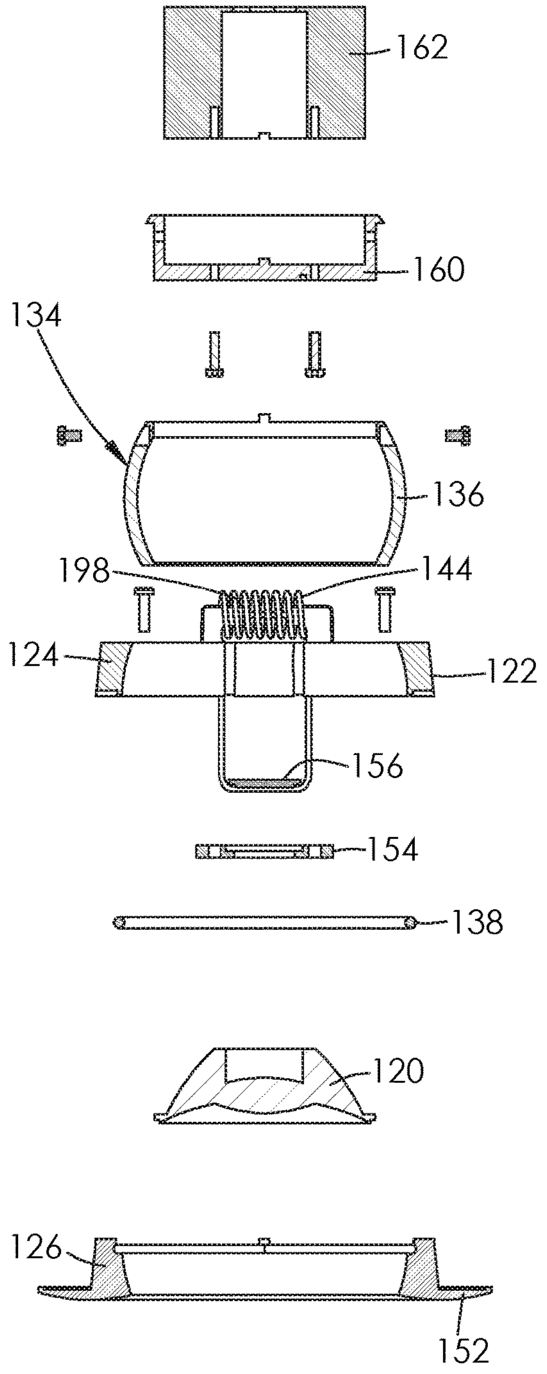
FIG. 15 is an exploded, side sectional view of the lighting fixture of FIG. 12 taken along lines 15-15 of FIG. 14.

FIGS. 11 to 14 show an alternative embodiment which is the same as the above embodiment except as described below. Like parts are given like numbers in the "100" series. In this embodiment, the bracket 154 is provided with a pair of apertures 180 and 182 extending therethrough, each of which is configured for receiving a respective one of bolts 184 and 186. The heat sink 160 is provided with corresponding threaded bores 188 and 190 which each threadedly receive a respective one of the bolts 184 and 186. The bolts 184 and 186 can be removed along with the light-emitting diode 156 and bracket 154 as shown in FIG. 12 to allow the light-emitting diode to be replaced.

It will be understood by a person skilled in the art that many of the details provided above are by way of example only, and are not intended to limit the scope of the invention which is to be determined with reference to the following claims.

What is claimed is:

1. A recessed lighting fixture comprising:

a body having a central cavity in the form of a socket;

a lighting support member fitted within the socket of the body, whereby the lighting support member is pivotable relative to the body, but air flow between the socket of the body and the exterior portion of the lighting support member is restricted;

a first arm extending outwardly from the body, wherein the first arm is biased to contact an upper, interior surface of a ceiling to retain the recessed lighting fixture in position in the ceiling; and a second arm extending outwardly from the body, wherein the second arm is biased to contact the upper, interior surface of the ceiling to retain the recessed lighting fixture in position in the ceiling.

2. The recessed lighting fixture of claim 1, wherein the lighting support member has a bottom and a light source is mounted to the lighting support member adjacent the bottom thereof.

3. The recessed lighting fixture of claim 2, wherein the light source is a light-emitting diode.

4. The recessed lighting fixture of claim 1, wherein the body is an annular body with a partially spherical socket, and the lighting support member has a partially spherical exterior portion fitted within the partially spherical socket of the annular body.

5. The recessed lighting fixture of claim 4, further including a resilient, annular seal which sealingly extends between the partially spherical exterior portion of the lighting support member and the partially spherical socket of the annular body.

6. The recessed lighting fixture of claim 5, wherein the seal is an annular O-ring.

7. The recessed lighting fixture of claim 6, wherein the O-ring is made of silicone.

8. The recessed lighting fixture of claim 1, wherein the body has a bottom, and the lighting fixture has an outwardly extending annular flange adjacent the bottom of the body for fitting over an exterior surface of a ceiling.

9. The recessed lighting fixture of claim 1, wherein the first arm extending outwardly from the body is biased with a spring.

10. The recessed lighting fixture of claim 1, wherein the lighting support member has a top, and the lighting fixture includes a heat sink mounted on the lighting support member adjacent to the top.

11. A recessed lighting assembly comprising:

(a) a recessed lighting fixture having a body with a central cavity in the form of a socket and a lighting support member having an exterior portion fitted within the socket of the body, whereby the lighting support member is pivotable relative to the body, but air flow between the partially spherical socket of the body and the exterior portion of the lighting support member is restricted;

a first arm extending outwardly from the body, wherein the first arm is biased to contact an upper, interior surface of a ceiling to retain the recessed lighting fixture in position in the ceiling;

a second arm extending outwardly from the body, wherein the second arm is biased to contact the upper, interior surface of the ceiling to retain the recessed lighting fixture in position in the ceiling; and (b) an electrical conductor connecting the lighting fixture to a power supply module.

12. The recessed lighting assembly of claim 11, wherein the lighting support member has a bottom, and a light source is mounted to the lighting support member adjacent to the bottom.

13. The recessed lighting assembly of claim 12, wherein the light source is a light-emitting diode.

14. The recessed lighting assembly of claim 11, wherein the body is an annular body with a partially spherical socket, and the lighting support member has a partially spherical exterior portion fitted within the partially spherical socket of the annular body.

15. The recessed lighting assembly of claim 14, further including a resilient, annular seal which sealingly extends between the partially spherical exterior portion of the lighting support member and the partially spherical socket of the annular body.

16. The recessed lighting assembly of claim 15, wherein the seal is an annular O-ring.

17. The recessed lighting assembly of claim 16, wherein the O-ring is made of silicone.

18. The recessed lighting assembly of claim 11, wherein the annular body has a bottom, and the lighting fixture has an outwardly extending annular flange adjacent the bottom of the annular body for fitting over an exterior surface of a ceiling.

19. The recessed lighting assembly of claim 11, wherein the first arm extending outwardly from the body is biased with a spring.

20. The recessed lighting assembly of claim 11, wherein the lighting support member has a top and the lighting fixture includes a heat sink mounted on the lighting support member adjacent the top.

* * * * *